April 11, 1944. I. N. EUSTIS ET AL 2,346,370
RAILWAY VEHICLE
Filed Aug. 26, 1942 3 Sheets-Sheet 1

April 11, 1944.  I. N. EUSTIS ET AL  2,346,370
RAILWAY VEHICLE
Filed Aug. 26, 1942  3 Sheets-Sheet 2

April 11, 1944.   I. N. EUSTIS ET AL   2,346,370
RAILWAY VEHICLE
Filed Aug. 26, 1942   3 Sheets-Sheet 3

Inventors
Irving N. Eustis
John Boyce
John C Olsen

Patented Apr. 11, 1944

2,346,370

UNITED STATES PATENT OFFICE 2,346,370

RAILWAY VEHICLE

Irving N. Eustis, John Boyce, and John C. Olsen, Fairmont, Minn., assignors to Fairmont Railway Motors, Inc., Fairmont, Minn., a corporation of Minnesota Application August 26, 1942, Serial No. 456,150

8 Claims. (Cl. 105—178)

This invention relates to improvements in railway vehicles and it consists of the matters hereinafter described and more particularly pointed out in the appended claims. The present invention is more especially concerned with the lighter and smaller railway vehicles such as motor cars, hand cars, push cars and the like.

One of the objects of the present invention is to provide a railway vehicle of the kind mentioned, wherein the wheels at opposite sides of the vehicle may be adjusted toward or away from each other so that the vehicle may be used upon railway tracks of different gauges.

A further object of the invention is to provide a railway vehicle of this kind wherein certain like wheels at opposite sides of the track are so connected to a driving axle that the axle will drive said wheels in any gauge for which said wheels have been adjusted or set.

Also, it is an object of the invention to provide a vehicle of this kind wherein the parts are so formed that the wheels may be adjusted to the desired gauge without the use of alternate parts and merely by adjusting the parts already included in the vehicle.

Again, it is an object of the invention to provide a vehicle of this kind employing novel wheel units in which the front and rear wheels are journalled and which units include parts whereby they may be so attached to the frame of the vehicle as to be adjusted toward or away from each other so as to vary the gauge of the wheels of the vehicle.

The above mentioned objects of the invention, as well as others, together with the advantages thereof will more fully appear as the specification proceeds.

In the drawings:

Fig. 4 is a transverse vertical sectional view through a part of the car or vehicle, on an enlarged scale, as taken on the line 4—4 of Fig. 1.

Fig. 5 is a transverse vertical detail sectional view through the structure shown in Fig. 4 as taken on the line 5—5 thereof.

Fig. 6 is a detail vertical sectional view through a part of the vehicle as taken on the line 6—6 of Fig. 1.

The "gauge" of a railway track as used herein is the distance between the heads of the rails, measured at a right angle at a point about 5/8 of an inch below the top of the heads of the rails. The "standard" gauge is 56½ inches. However, tracks having a gauge of 66 inches are in use and are known as "wide" gauge tracks and other tracks having a gauge of 30 inches are in use and are known as "narrow" gauge tracks. It is advisable in narrow gauge track to employ a car or vehicle not wider than 63¼ inches so as to clear bridges and tunnels therealong. It is obvious that a car for a 66 inch gauge track must be considerably wider than 63¼ inches.

In the present instance we have provided a railway motor car wherein the gauge of the wheels may be varied so that the car may be used upon wide, standard or narrow gauge track, as is necessary, merely by making certain adjustment of the parts involved. Thus it is not necessary to make any change or substitution of or in said parts.

Figure 2:
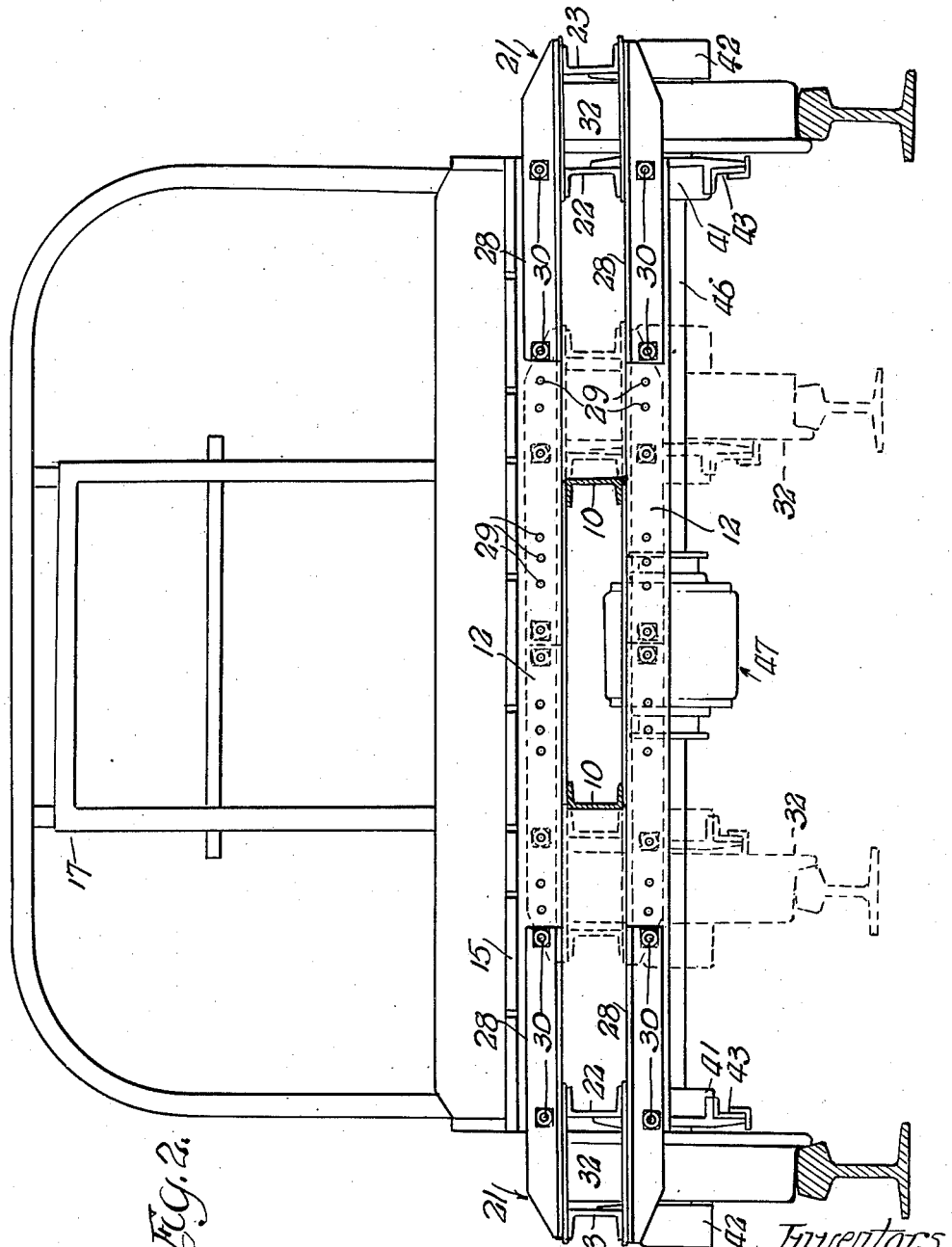
Fig. 2 is a view in end elevation, on an enlarged scale, of the railway motor car appearing in Fig. 1 and shows the wheel units thereof set or adjusted for comparatively wide and narrow gauge railway tracks respectively.

Referring now in detail to the invention as embodied in a railway motor car, the frame of said car as shown herein includes a pair of longitudinal sill members 10—10 in the form of a pair of channels arranged with their flanges facing each other as best appears in Fig. 2. These sill members are connected together toward their front and rear ends by pairs of front and rear end cross sills 11 and 12 respectively, which project a suitable distance beyond each sill 10—10 and define the greatest width of the car frame. 13 indicates an intermediate transverse sill member disposed upon the top flanges of the longitudinal sill members and secured thereto and to associated gusset plates 14 (see Fig. 3) in any suitable manner.

The transverse sill members 11, 12 and 13 support the deck or floor 15 of the car. At the front end thereof, as appears in Fig. 1, there is located a housing 16 for the engine or motor (not shown) for driving the car. At the rear end of said deck or floor is a raised platform 17. This leaves a space 18 between said housing and platform and in which space is disposed a transmission shift lever 19 and a brake operating lever 20 in a position convenient for the operator.

Figure 3:
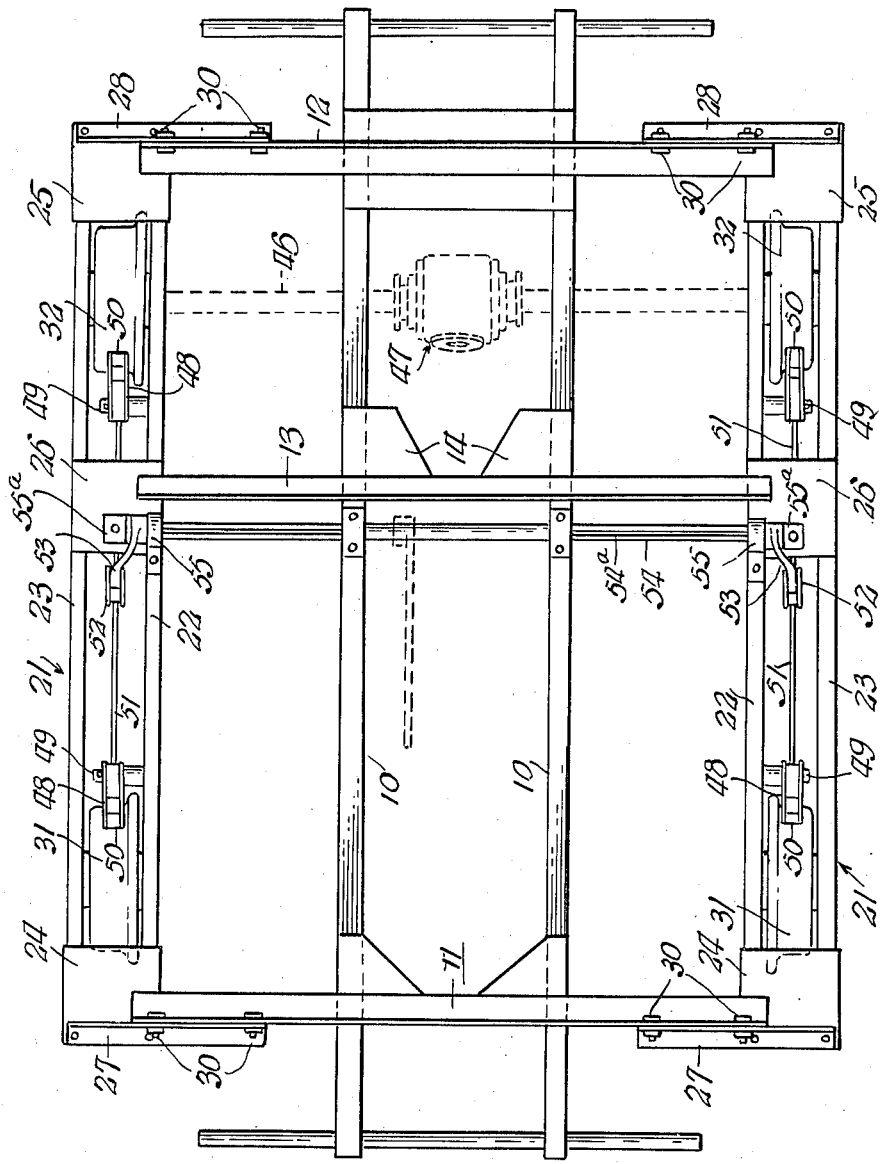
Fig. 3 is a top plan view of the framing of the car or vehicle of Fig. 1, in connection with the wheel units at each side of said car or vehicle.

At each side of the framing is located a wheel unit 21. As best shown in Fig. 3, each wheel unit embodies a pair of laterally spaced inner and outer channels 22 and 23 respectively connected together by pairs of top and bottom end gusset plates 24 and 25 respectively and by an intermediate gusset plate 26. At each end of the wheel units are inwardly extending, top and bottom structural members 27 and 28 respectively. Said members are in the form of angle bars and they are so spaced longitudinally of the unit that the upright flanges thereof will engage the like flanges of the transverse sill members 11 and 12 of the frame, as best shown in Fig. 3. The engaged flanges of said members 27—28 and transverse sill members 11 and 12 are provided with holes 29 which are adapted to be brought into register with each other, and when so registered, to receive bolts 30 whereby the wheel units may be securely but adjustably connected to the framing of the car. By reason of the construction just described, the wheel units may be adjusted toward or away from each other and when secured to the framing, assures that the wheel units are "square" with the car framing.

Associated with each wheel unit is a front wheel 31 and a rear wheel 32 and which wheels are disposed in the space between the channels of the associated wheel unit 21 and with their axes disposed below the bottom edge of said channels. As best shown in Fig. 4, each wheel includes a pressed steel wheel body 33 and a hub 34. The hub has an axial length greater than that of the wheel body and each end of the hub is made as a tubular extension 35 for a purpose to appear later. The central portion of the hub is formed with a radial flange 36 to which a part of the wheel body is attached by bolts and associated nuts 37. An insulation disc 38 is disposed between the flange 36 and wheel body and a ferrule 39 of insulation is disposed between each bolt 37 and the hub flange 36 and whereby while the wheel body is securely but detachably connected to the hub, it is insulated therefrom.

Each hub extension 35 has an antifriction bearing member 40 mounted thereon and each bearing member is securely held in inner and outer housings 41 and 42 respectively, which depend from and are bolted to the bottom flange of the associated channels 22 and 23 respectively of the wheel unit. The bearings 40 are of the antifriction type that provide for both a rotative and an end thrust bearing for each wheel. Preferably the housings 42—42 of each unit are tied or connected together by an angle strut 43.

A part of the hub 34 of the rear wheel in each unit is formed with internal splines and grooves 44 and 45 respectively (see Fig. 5) to receive the complemental ends of a driving axle 46 which is of substantially the same length as the transverse sill members 11 and 12 of car framing. When the ends of the axle are disposed in the hubs of the wheels 32—32, they have a driving but sliding connection therewith. Thus a driving connection is maintained between the axles and the wheels at the different spaced apart or adjusted positions, the said wheels may have with respect to each other.

The central portion of each axle passes through a housing 47 of a suitable transmission mechanism which is driven from the engine or motor before mentioned. As the structure of the transmission forms no particular part of the present invention, it is not illustrated herein.

Figure 1:
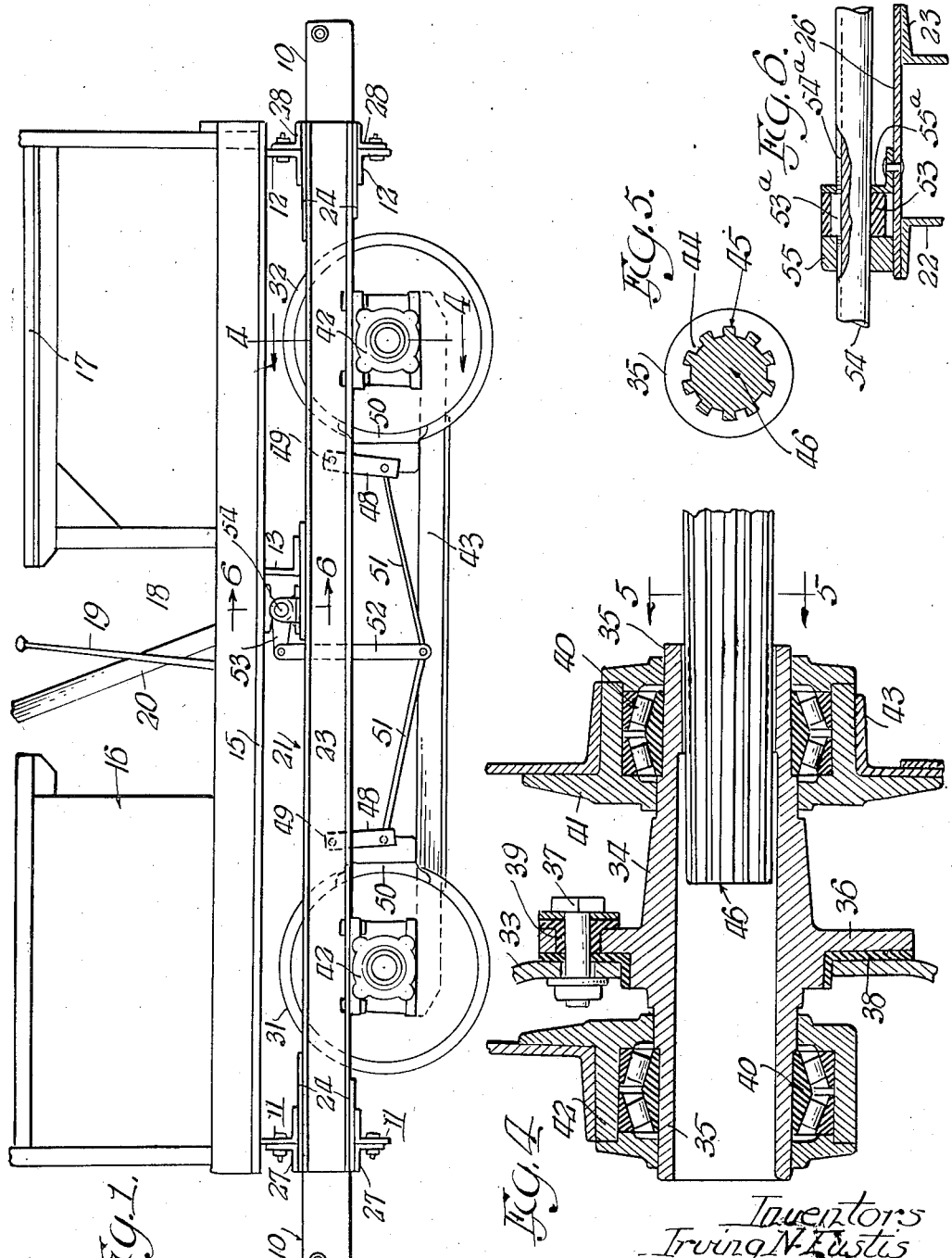
Fig. 1 is a view in side elevation of a railway motor car embodying the preferred form of the invention.

Each wheel unit carries suitable brake rigging which is best shown in Fig. 1. Such rigging may include a hanger 48 for each wheel and the top end of each hanger is pivoted at 49 in the unit. Each hanger carries a brake shoe 50 for peripheral braking engagement with the associated wheel. The bottom end of each hanger has pivotally connected thereto one end of a link 51 and the other end of both links are pivotally connected to the bottom end of an actuator bar 52. The top end of each actuator bar is pivotally connected to an arm 53, the hub of which carries a key 53ᵃ that has sliding engagement in a groove 54ᵃ in the associated end of a transverse rock shaft 54 to which the brake lever 20 before mentioned is operatively connected. The ends of the shaft 54 are journalled in bearings 55 carried by the inner channel 22 of each wheel unit, and one end of the hub of the associated arm 53 engages against the associated bearing. Associated with the hub of each arm 53 is a clip 55ᵃ rising from the associated gusset plate 26 and which clip engages the other end of the associated hub. Thus the bearing 55 and clip 55ᵃ prevent displacement of the key 53ᵃ from the hub of each arm 53. This structure best appears in Fig. 6.

When the wheel units are set for the widest gauge of the wheels as shown in full lines in Fig. 2, said wheels of each unit are disposed toward the outer ends of the transverse sill members 11—12 and 13 respectively. To change the gauge of the wheels of said units for a narrower one, the bolts 30 that are employed to secure the members 27 and 28 of said units to the transverse sills 11 and 12 are first removed. Each unit is then moved inwardly toward the other and the bolts 30 are then inserted through the registering holes in the members 27 and 28 and sills 11 and 12 and the associated nuts are then applied thereto. This sets the wheels of the vehicle to the desired narrow gauge as appears in dotted lines in Fig. 2. In so changing the wheel gauge, as the wheel units are moved inwardly, the wheel hubs 34 slide on the ends of the axle 46 without disturbing the driving connection therebetween. In this respect it is pointed out that the holes in the wheel unit members 27—28 and in the transverse sills 11 and 12 are so spaced apart as to locate the wheels for the recognized gauges of a substantially all wide and narrow gauge track. As the wheel units 21—21 are moved laterally inwardly or outwardly, each will carry its own brake rigging therewith, the arms 53 sliding along the shaft 54 without in any way changing the splined connection therewith.

As is obvious, the invention is applicable to non-driven railway vehicles such as push cars and the like. In such instances, the axle 46 may be omitted and thus there would be no necessity for providing the splined internal structure for the hubs of the wheels.

The improved construction described is simple and efficient in operation and may be adjusted to fit any recognized track gauge. Should an "odd" gauge track be encountered as in some privately owned trackage, the wheel units may be adjusted thereto and locked in the adjusted position simply by drilling the holes in the proper place in the transverse sill members.

While in describing the invention, we have referred in detail to the form, arrangement and construction of the parts involved, the same is to be considered only in the illustrative sense so that we do not wish to be limited thereto except as specifically set forth in the appended claims.

We claim as our invention:

1. A railway vehicle embodying therein a frame including longitudinal sill members and pairs of transverse frame members secured thereto, a wheel unit at each side of the vehicle and having front and rear wheels journalled therein, portions of each wheel unit being disposed between the frame members of each pair, means operatively connecting each wheel unit to the parts of the transverse frame members between which it is disposed, the connecting means for one of said units with its associated parts of said transverse frame members permitting of a lateral adjustment of one of said units toward or away from the other unit to provide a variable gauge for the front and rear wheels of the vehicle, and a driving axle extending between like wheels at opposite sides of the vehicle and having a driving but sliding engagement with at least one of said like wheels.

2. A railway vehicle embodying therein a frame including longitudinal sill members and pairs of top and bottom, transverse, spaced apart sill members secured thereto, a wheel unit at each side of the vehicle and having front and rear wheels journalled therein, means for operatively securing one of said wheel units to the associated side of the vehicle, portions of the wheel unit at the other side of the vehicle being disposed in the plane of the space between end portions of the top and bottom transverse sill members at said other side of the vehicle, and means operatively connecting the last mentioned wheel unit to said end portions of the transverse sill members, said connecting means permitting of a lateral adjustment of the last mentioned wheel unit toward or away from the first mentioned unit to provide a variable gauge for the front and rear wheels of the vehicle.

3. A railway vehicle embodying therein a frame including longitudinal sill members and pairs of top and bottom, transverse, spaced apart sill members secured thereto, a wheel unit at each side of the vehicle and having front and rear wheels journalled therein, portions of the wheel units at each side of the vehicle being disposed in the plane of the space between end portions of the transverse sill members at the same side of the vehicle, and means operatively connecting each wheel unit to the associated end portions of said transverse sill members, said connecting means permitting of a lateral adjustment of said wheel units toward or away from each other to provide a variable gauge for the front and rear wheels of the vehicle.

4. A railway vehicle embodying therein a frame including longitudinal sill members and pairs of top and bottom, transverse, spaced apart sill members secured thereto and having end portions extending outwardly therebeyond, a wheel unit at each side of the vehicle and having front and rear wheels, journalled therein, means for operatively securing one of said wheel units to the associated side of the vehicle, means carried by the other wheel unit and extending inwardly therefrom and arranged for engagement with end portions of the transverse sill members on the same side of the vehicle, and means operatively connecting said means carried by the last mentioned unit and the associated end portions of said transverse sill members, said last mentioned means permitting of a lateral adjustment of the last mentioned wheel unit toward or away from the first mentioned wheel unit to provide a variable gauge for the front and rear wheels of the vehicle.

5. A railway vehicle embodying therein a frame including longitudinal sill members and pairs of top and bottom, transverse, sill members engaged with and having end portions extending outwardly beyond said longitudinal sill members, a wheel unit at each side of the vehicle and having front and rear wheels journalled therein, each unit being disposed in the plane of the space between said pairs of top and bottom transverse sill members, and means carried by each unit and extending inwardly therefrom and engaged with said end portions of said transverse sill members and means operatively connecting said inwardly extending members on said units to said ends of the transverse sill members, said connecting means permitting of lateral adjustment of said wheel units toward or away from each other to provide a variable gauge for the front and rear wheels of the vehicle.

6. A railway vehicle embodying therein a frame including longitudinal sill members and pairs of transverse upper and lower sill members secured thereto and having end portions extending outwardly therebeyond, a wheel unit at each side of the vehicle and comprising parallel laterally spaced side frame members, means connecting said side frame members together in spaced relation and front and rear wheels disposed between and journalled with respect to said frame members, pairs of upper and lower arms fixed to the frame members of each unit and extending inwardly therefrom and arranged to engage the end portions of the pairs of transverse upper and lower sill members, and means for connecting said upper and lower arms of each unit to said end portions of said pairs of transverse upper and lower sill members, said connecting means permitting of a lateral adjustment of said wheel units toward or away from each other to provide a variable gauge for the front and rear wheels of the vehicle.

7. A railway vehicle embodying therein a frame narrower than the widest gauge track usable by the vehicle, said frame including longitudinal sill members and pairs of transverse sill members secured to said longitudinal sill members and having end portions extending outwardly therebeyond, a wheel unit at each side of the vehicle and including a frame and pairs of front and reer wheels journalled therein, pairs of members secured to and extending inwardly from each wheel unit and arranged for engagement with the said transverse sill members, and means for connecting said means on said wheel units to said transverse sill members and operative to permit a lateral adjustment of the wheel units from a point outwardly beyond the end portions of the transverse sill members providing the widest gauge for said front and rear wheels to a point spaced inwardly of said end portions of said transverse sill members providing the narrowest gauge for said front and rear wheels.

8. A railway vehicle embodying therein a frame including longitudinal sill members and pairs of upper and lower transverse sill members secured to the top and bottom portions of said longitudinal sill members and having end portions extending outwardly therebeyond, flooring supported upon said upper transverse sill members and having a width less than the widest gauge track usable by the vehicle, a wheel unit at each side of the vehicle and including a frame with laterally spaced, connected together side members and wheels journalled in said frame between said frame members, means secured to the frame members of each of said units and extending inwardly therefrom and arranged for engagement with said end portions of said transverse sill members and means connecting said means secured to the frame members of said units to said end portions of said transverse sill members for operatively securing them together, said connecting means being operable to permit of a lateral adjustment of the wheel units to dispose the front and rear wheels thereof in a plane outwardly beyond the edges of the flooring for the widest gauge track or in a plane spaced inwardly from said edges of the flooring for the narrowest gauge track.

IRVING N. EUSTIS.
JOHN BOYCE.
JOHN C. OLSEN.